United States Patent [19]
Schmitz

[11] Patent Number: 6,138,364
[45] Date of Patent: Oct. 31, 2000

[54] VARIABLE ANGLE RECIPROCATING TOOL

[76] Inventor: Jeffrey F. Schmitz, 3 Pine Ridge Rd., Asheville, N.C. 28804

[21] Appl. No.: 09/186,931

[22] Filed: Nov. 6, 1998

Related U.S. Application Data

[63] Continuation of application No. 08/693,400, Aug. 7, 1996, Pat. No. 5,832,611.

[51] Int. Cl.⁷ .............................. B23D 49/04; B25F 3/00
[52] U.S. Cl. ................................ 30/392; 30/122; 30/394; 83/699.21; 83/747; 173/29
[58] Field of Search .............................. 30/392, 393, 394, 30/122, 500, 340, 344, 519; 83/747, 750, 699.21, 699.31; 173/29, 170

[56] References Cited

U.S. PATENT DOCUMENTS

| | | |
|---|---|---|
| 1,808,228 | 6/1931 | Hulack et al. |
| 2,435,225 | 2/1948 | Kolodner et al. |
| 2,619,132 | 11/1952 | Pierce |
| 2,621,689 | 12/1952 | Fordon |
| 2,966,931 | 1/1961 | Dreier |
| 3,156,837 | 11/1964 | Weller et al. |
| 3,494,391 | 2/1970 | Mango |
| 3,547,166 | 12/1970 | Dudek |
| 3,555,678 | 1/1971 | Agulnick et al. |
| 3,802,079 | 4/1974 | Ketchpel, Jr. et al. |
| 3,876,015 | 4/1975 | Kivela |
| 3,892,158 | 7/1975 | Smeets |
| 4,137,632 | 2/1979 | Pfanzer |
| 4,379,362 | 4/1983 | Getts |
| 4,727,941 | 3/1988 | Fulton |
| 4,819,334 | 4/1989 | Mongeon |
| 5,063,807 | 11/1991 | Abel |
| 5,165,173 | 11/1992 | Miller |
| 5,185,934 | 2/1993 | Tillman |
| 5,193,281 | 3/1993 | Kasten |
| 5,421,091 | 6/1995 | Gerritsen, Jr. |

FOREIGN PATENT DOCUMENTS

| | | | |
|---|---|---|---|
| 636160 | 2/1962 | Canada | 30/519 |
| 865214 | 9/1981 | Russian Federation | 30/392 |

*Primary Examiner*—M. Rachuba
*Assistant Examiner*—Sean Pryor
*Attorney, Agent, or Firm*—Carter & Schnedler, P.A.

[57] ABSTRACT

A hand-held reciprocating power tool, such as a reciprocating saw, wherein the angle of the reciprocation motion axis with reference to the longitudinal axis of the power tool motor housing is adjustable. Within a motor housing there is a motor driving a motor shaft which rotates on a motor shaft axis generally along the longitudinal axis. A nosepiece includes a nosepiece base portion fixed to the motor housing, and a nosepiece movable portion rotably mounted to the nosepiece base portion. The nosepiece moveable portion can be positionally adjusted relative to the nosepiece base portion over an angle of at least 180° by rotation on a nosepiece axis which is perpendicular to the motor shaft axis. A reciprocating element is supported by the nosepiece moveable portion. A motion conversion mechanism, such as a Scotch yoke, within the nosepiece converts motor shaft rotation to reciprocation motion and drives the reciprocating element in reciprocation regardless of the rotational position of the nosepiece moveable portion on the nosepiece axis with reference to the nosepiece base portion. A toolholder is fixed to the reciprocating element for attachment of a tool, such as a saw blade. The toolholder is capable of being positionally adjusted to various angular orientations on the reciprocation motion axis, for example, angular orientations at 90° intervals.

10 Claims, 16 Drawing Sheets

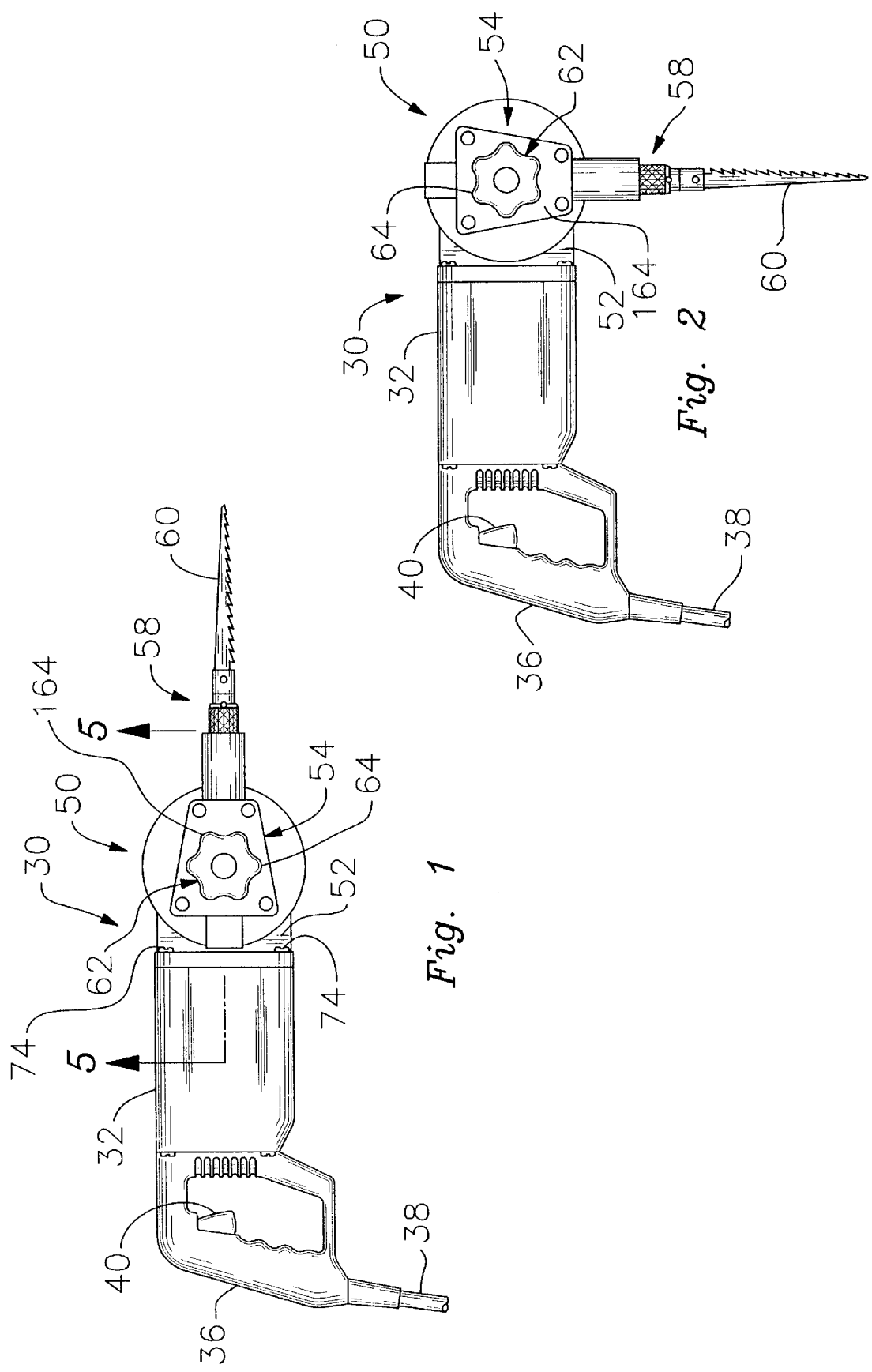

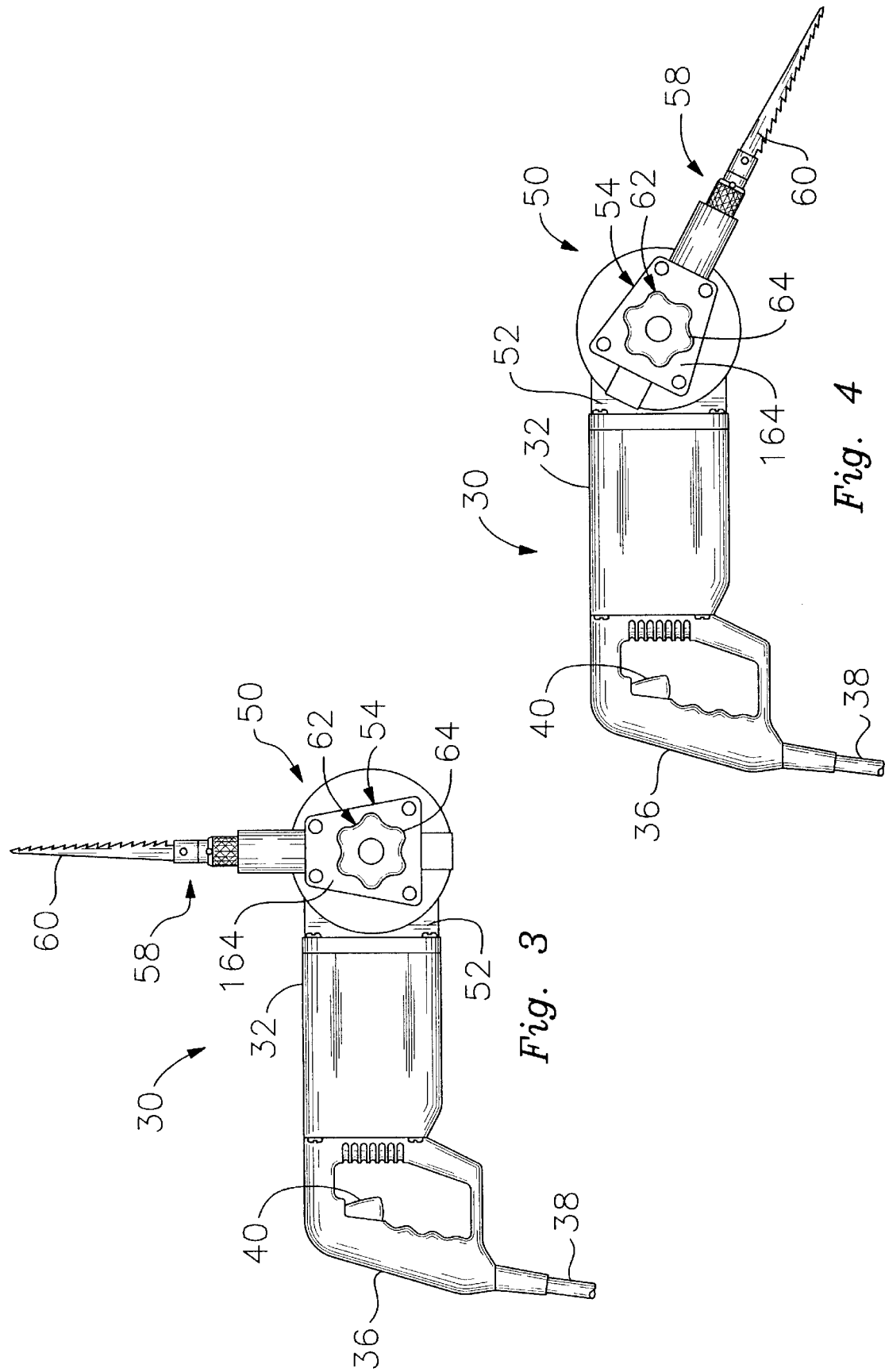

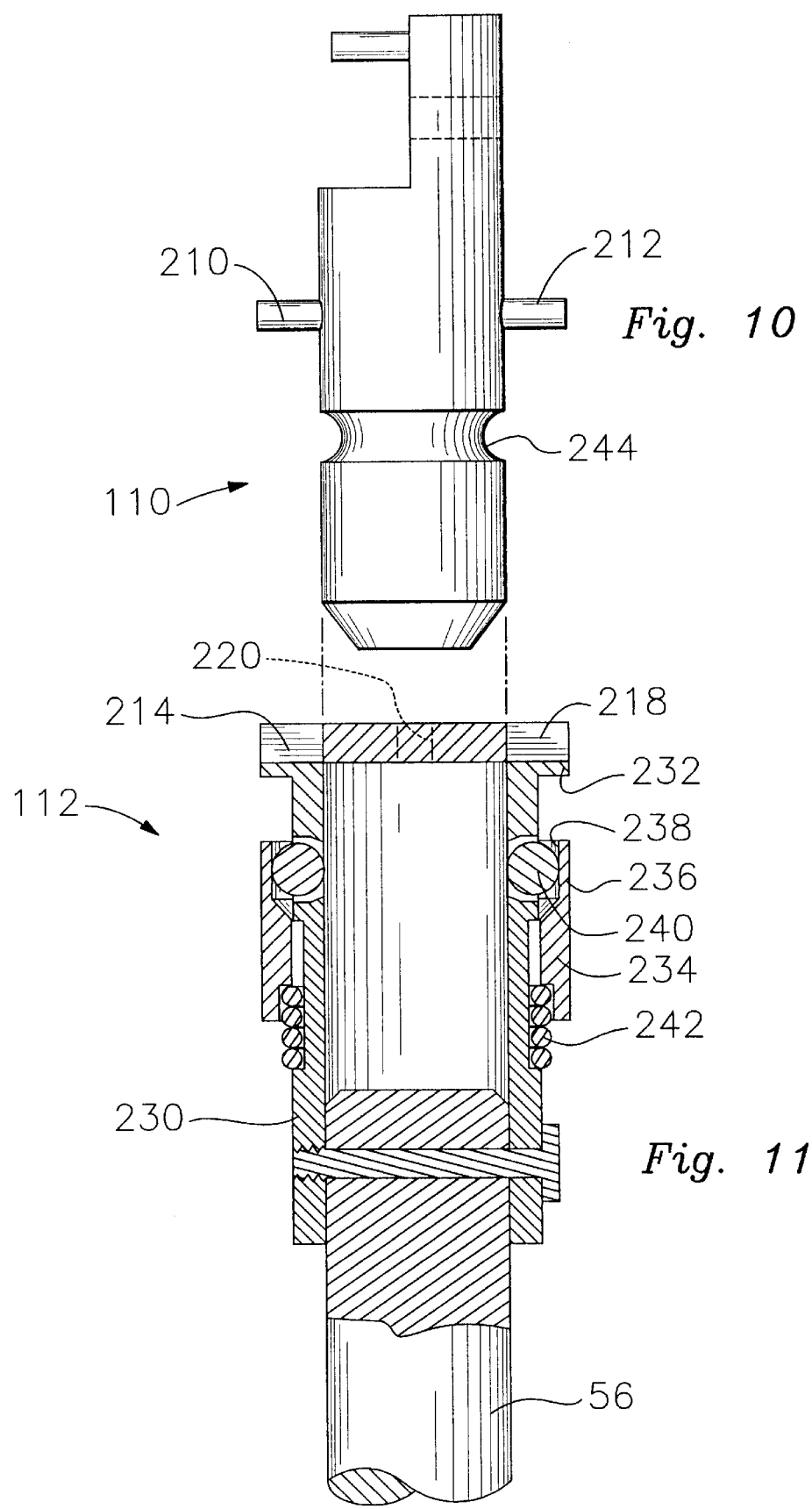

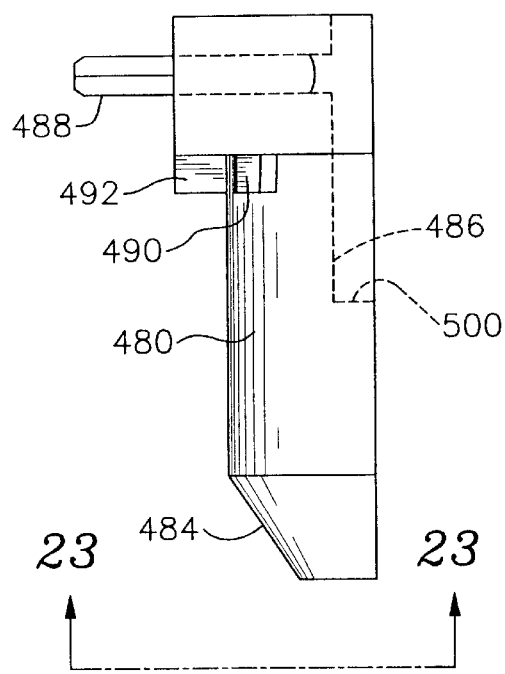
Fig. 22
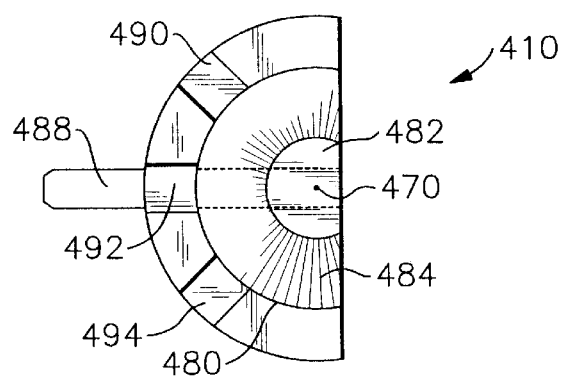
Fig. 23
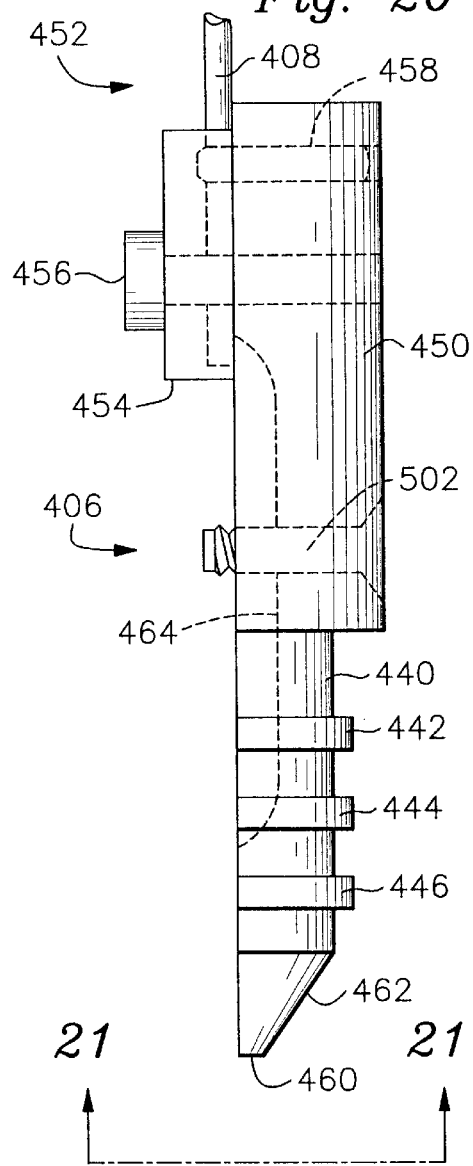
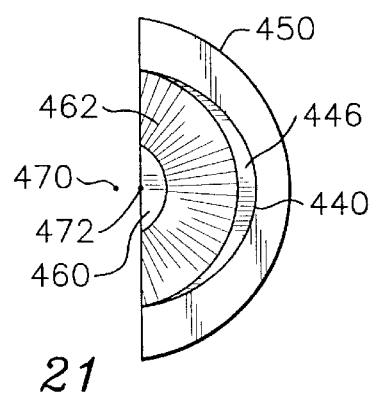
Fig. 21

VARIABLE ANGLE RECIPROCATING TOOL

CROSS REFERENCE TO RELATED APPLICATION

This is a continuation of prior application Ser. No. 08/693,400, filed Aug. 7, 1996, now U.S. Pat. No. 5,832,611.

BACKGROUND OF THE INVENTION

The present invention relates generally to reciprocating power tools such as reciprocating saws and, more particularly, to reciprocating tools in which the direction of the reciprocation can be changed.

A well known hand-held power tool available from various manufacturers is known as a reciprocating saw, which takes the form of an elongated somewhat cylindrical motor housing with a handle at one end and a nosepiece at the other end. The motor housing may be viewed as having a longitudinal axis. The motor drives a motor shaft which rotates on a motor shaft axis generally coincident with the longitudinal axis of the motor housing, and a motion conversion mechanism within the nosepiece converts motor shaft rotation to reciprocation of a tool holder to which a saw blade or other tool is attached. A typical motion conversation mechanism is known as a Scotch yoke. Conventionally, the reciprocation direction is in line with the motor housing or body of the tool, but is offset somewhat from the motor shaft axis. Thus, due to the mechanical arrangement of the motion conversion mechanism, the saw blade typically reciprocates along a reciprocation axis parallel to the motor shaft axis, not necessarily coincident with the motor shaft axis.

Such reciprocating saws have proven to be of great utility, particularly to construction tradesmen such as carpenters, plumbers and electricians, due to the ability of such saws, when fitted with an appropriate saw blade, to rapidly cut virtually any material used in construction. Nevertheless, situations occur where there is insufficient clearance to position the power tool to bring the actual tool, that is, the saw blade, to bear in the desired working spot; the bulk and configuration of the power tool interfere.

A similar situation can occur in the case of a power drill. In the case of power drills, the problem has been resolved by the provision of an angle head drill, which includes a gear arrangement whereby the drill bit rotates at a fixed 90° angle with reference to the drill motor axis. In the case of a power drill, there is a straightforward solution because the motion is rotation throughout; no conversion of rotary to reciprocating motion is involved.

Various attachments have been proposed to improve the versatility of a reciprocating saw. As one example, Tillman U.S. Pat. No. 5,185,934 discloses a flexible extension which attaches to the end of a reciprocating saw. The flexible extension has a remote handle which supports a reciprocating blade. Reciprocating motion generated by the power tool is transmitted through the flexible extension to the saw blade. The reciprocating motion is thus transferred to any direction desired, within the limits of the flexible extension.

As another example, Kasten U.S. Pat. No. 5,193,281 discloses an attachment for a reciprocating saw, which likewise transfers the reciprocating motion generated by the power tool to a different direction, such as at right angles. Kasten discloses several specific mechanisms for transferring reciprocating motion generated by the power tool to reciprocating motion of the saw blade in a different direction.

A disadvantage common to both of these prior art approaches, particularly that of Kasten U.S. Pat. No. 5,193,281, is that they add size and bulk to the hand-held power tool. Moreover, being attachments, the mechanisms must either be carried separately and attached to the hand held power tool when needed, or left permanently attached, adversely affecting the utility of the power tool for use in its normal configuration wherein reciprocating motion of the saw blade is generally in line with the longitudinal axis of the motor housing.

SUMMARY OF THE INVENTION

Accordingly, it is an object of the invention to provide a hand held reciprocating power tool, such as a reciprocating saw, wherein the angle of the reciprocation motion axis with reference to the longitudinal axis of the power tool motor housing is adjustable for versatility.

It is another object of the invention to provide such a variable angle reciprocating tool which has a length no greater than that of a standard, fixed-direction in-line reciprocating tool, and with no adverse effect on utility in its "normal" in-line configuration.

Briefly, in accordance with an overall aspect, the invention is based on a recognition that an existing mechanism for converting motor shaft rotation to reciprocating motion can be adapted to provide angular adjustment, with no increase whatsoever in the overall length of the hand held power tool.

More particularly, a hand held reciprocating power tool in accordance with the invention includes a motor housing within which there is a motor driving a motor shaft which rotates on a motor shaft axis, which may be viewed as generally along the longitudinal axis of the hand held power tool, or generally along the longitudinal axis of the motor housing. At one end of the motor housing there is a handle, and at the opposite end there is a nosepiece. The nosepiece includes a nosepiece base portion fixed to the motor housing, and a nosepiece moveable portion mounted to the nosepiece base portion. The nosepiece moveable portion is capable of being positionally adjusted relative to the nosepiece base portion by rotation on a nosepiece axis, which preferably is perpendicular to the motor shaft axis.

A reciprocating element is supported by the nosepiece moveable portion for motion having a reciprocating component, and a tool holder is fixed to the reciprocating element for attachment of a tool, such as a saw blade. Within the nosepiece is a motion conversion mechanism for converting motor shaft rotation to reciprocating element motion at various rotational positions of the nosepiece movable portion on the nosepiece axis with reference to the nosepiece base portion.

In a more particular embodiment, within the nosepiece there is a driven gear, driven by a pinion gear connected to the motor shaft. The driven gear rotates on the nosepiece axis, the same axis about which the nosepiece moveable portion rotates for adjustment purposes. A crank pin is connected either directly or indirectly to the driven gear, radially offset a distance from the nosepiece axis such that the crank pin has a circular motion as the driven gear rotates. The reciprocating element includes a yoke element engaging the crank pin such that the reciprocating element is driven to reciprocate along a reciprocation motion axis as the driven gear rotates, regardless of the particular rotational position of the nosepiece movable portion with reference to the nosepiece base portion. Preferably the reciprocation motion axis is perpendicular to the nosepiece axis such that the reciprocating element reciprocates within a reciprocating element plane perpendicular to the nosepiece axis at all adjustment positions.

Preferably, the nosepiece movable portion is capable of being positionally adjusted over an angular range of at least 180° by rotation on the nosepiece axis, thus selectively redirecting the reciprocation direction of the tool (e.g. the saw blade) with reference to the longitudinal axis of the tool over an angular range of at least 180°. At an intermediate adjustment position of the nosepiece moveable portion, the reciprocating element reciprocates along a line parallel to the motor shaft axis, resulting in a "normal" in-line orientation of the saw blade. There also is a clamping mechanism for holding the nosepiece moveable portion in any selected rotational position with reference to the nosepiece base portion.

For additional versatility, the toolholder is capable of being positionally adjusted to various angular orientations on the reciprocation motion axis, for example, various angular orientations at 90° intervals. Depending upon the selected angular position of the nosepiece movable portion, a particular angular orientation of the saw blade on the reciprocation motion axis may be most convenient.

BRIEF DESCRIPTION OF THE DRAWINGS

While the novel features of the invention are set forth with particularity in the appended claims, the invention, both as to organization and content, will be better understood and appreciated from the following detailed description, taken in conjunction with the accompanying drawings, in which:

FIG. 1 is a side view of a hand-held reciprocating saw in accordance with the invention where the nosepiece angle is adjusted for "normal" in-line reciprocation;

FIG. 2 illustrates the power tool of FIG. 1 in which the nosepiece has been adjusted by rotation to a downward position where the motion axis is at 90° with reference to the longitudinal axis of the tool, and in which the angular orientation of the saw blade on the reciprocation motion axis has been rotated by 180° for a "jigsaw" configuration;

FIG. 3 similarly illustrates the tool of FIG. 1 wherein the nosepiece has been adjusted by upward 90° rotation where the motion axis is at a 90° angle with reference to the longitudinal axis of the tool, and 180° with reference to the FIG. 2 position;

FIG. 4 depicts an intermediate adjustment position of the nosepiece;

FIG. 10 is a view of the pin portion of a positionally-adjustable toolholder;

FIG. 11 is a cross-sectional view of the receiving element of the positionally-adjustable toolholder in a configuration to receive or release the pin of FIG. 10;

FIG. 20 is an elevational view of the blade shuttle of the alternative toolholder;

FIG. 21 is a bottom view taken on line 21—21 of FIG. 20;

FIG. 22 is an elevational view of the locking shuttle of the alternative toolholder;

FIG. 23 is bottom view taken on line 23—23 of FIG. 22;

DETAILED DESCRIPTION

Figure 5:
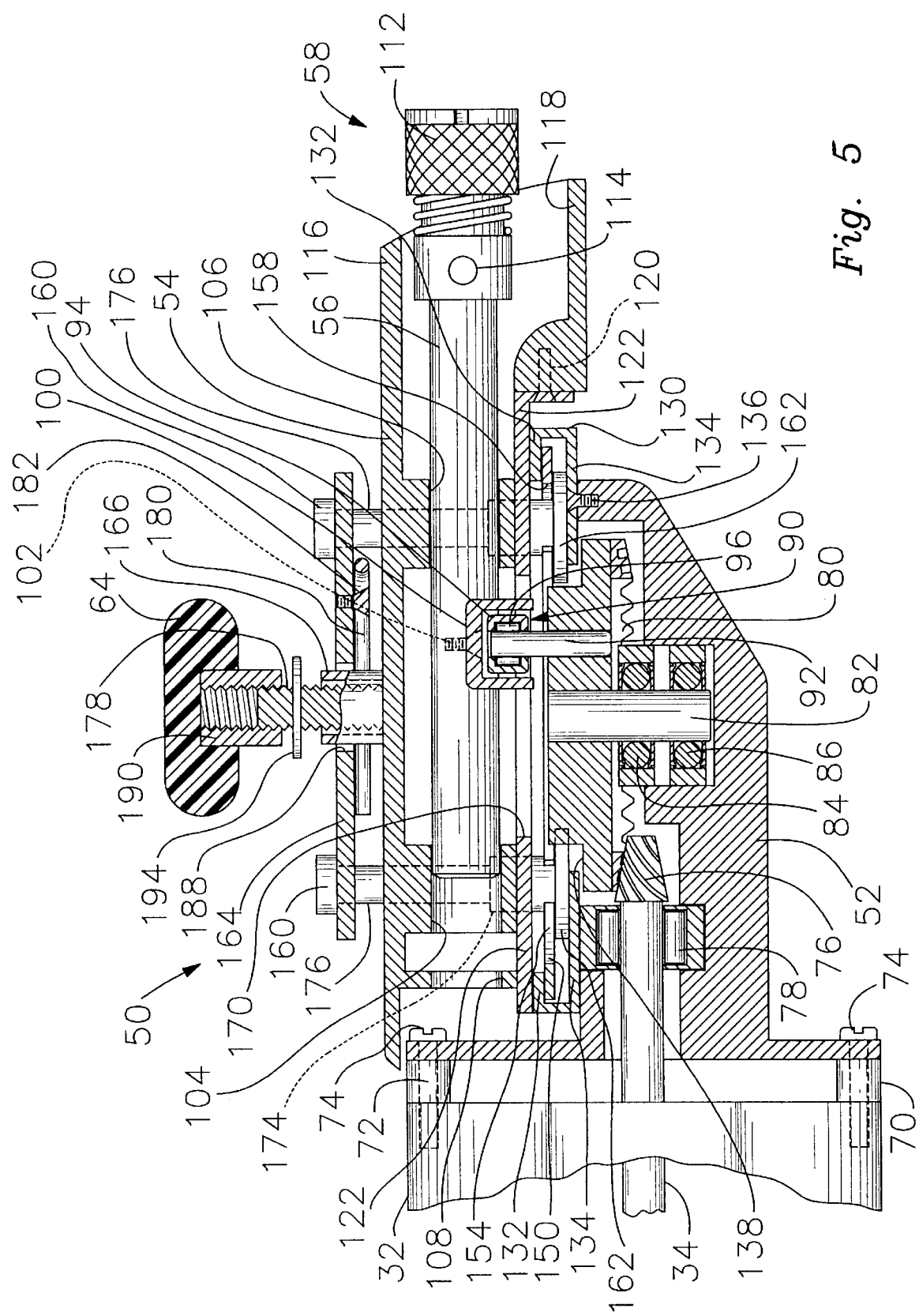
FIG. 5 is an enlarged cross-sectional view taken on line 5—5 of FIG. 1 with the saw blade removed.

Referring first to FIGS. 1–4 for an overview, a reciprocating power tool 30 in the form of a reciprocating saw 30 in accordance with the invention has a generally cylindrical motor housing 32 including a motor driving a motor shaft 34 (FIG. 5) which rotates on a motor shaft axis generally coincident with the longitudinal axis of the motor housing 32. A handle 36 is attached to one end of the motor housing 32, having an attached electric power cord 38, and supporting a trigger switch 40, all as is conventional.

At the other end of the power tool 30 is a nosepiece 50, including a nosepiece base portion 52 fixed to the motor housing 32, and a nosepiece movable portion 54 mounted to the nosepiece base portion 52, and capable of being positionally adjusted relative to the nosepiece base portion 52 by rotation on a nosepiece axis. The nosepiece axis is perpendicular to the axis of the motor shaft 34, and perpendicular to the plane of the drawing sheet of FIGS. 1–4.

Within the nosepiece 50 is a reciprocating element 56 (FIG. 5) in the form of a reciprocating bar 56 (FIG. 5) supported by the nosepiece moveable portion 54 for motion having a reciprocating component. A toolholder 58 is fixed to the reciprocating bar 56 (FIG. 5) for attachment of a tool, such as a saw blade 60. Preferably, motion of the reciprocating element 56 is strictly reciprocation. However, it will be appreciated that various forms of pseudo-reciprocation are possible, such as an orbital motion, which has a reciprocating component.

A conventional element, omitted for clarity of illustration, is a foot (not shown), which is held against a workpiece such that cutting action mainly occurs during the return stroke of the saw blade 60 when the saw blade is moving towards the nosepiece 50.

The orientation of FIG. 1 may be viewed as a conventional or "normal" configuration, wherein the saw blade 60 reciprocates on a reciprocation motion axis which is parallel to the motor shaft axis, but slightly offset from the longitudinal center line of the tool. Thus, within the nosepiece 50 is a motion conversion mechanism, such as a Scotch yoke, which converts rotation of the motor shaft 34 (FIG. 5) to reciprocation of the reciprocating bar 56 (FIG. 5) and the saw blade 60.

FIGS. 2, 3 and 4 depict various positional adjustment orientations of the nosepiece moveable portion 54 (by rotation on the nosepiece axis) and thus of the reciprocation motion axis of the reciprocating saw blade 60. In FIG. 2, the nosepiece movable portion has been rotated downwardly to a position herein referred to as +90°, while in FIG. 3 the nosepiece moveable portion 54 and saw blade 60 have been moved upwardly to a position herein referred to as −90°. (In the illustrated embodiment, FIGS. 2 and 3 do not represent limiting positions, as the nosepiece moveable portion can be adjustably rotated over an angular range exceeding 180°.) In FIG. 4, the nosepiece movable portion 54 and saw blade 60 have been rotated to a position of approximately +25°. As a separate adjustment, in FIG. 2 the angular orientation of the saw blade 60 on the reciprocation motion axis illustratively has been changed by 180°, resulting in a "jigsaw" configuration.

Significantly, in each of the positions of FIGS. 1, 2, 3 and 4, the saw blade 60 continues to reciprocate normally. Although not a safe practice, in fact the adjustment through the various positions of FIGS. 1, 2, 3 and 4 can be effected while the power tool 30 is operating and the saw blade 60 is reciprocating. The range of adjustment is continuous over a range in excess of 180°. Thus in FIG. 2 the nosepiece movable portion can be rotated further clockwise to angles greater than plus 90°; in FIG. 3, the nosepiece moveable portion can be rotated further counter-clockwise to angle less than minus 90° with reference to the "normal" in-line orientation of FIG. 1, which may be viewed as an intermediate position. The orientations of FIGS. 2 and 3 are particularly useful ones, in addition to the "normal" orientation of FIG. 1.

For holding the nosepiece movable portion 54 in any selected rotational position, there is a clamping mechanism, generally designated 62 and described in detail hereinbelow with reference to FIGS. 5–8. An element of the clamping mechanism 62 is a clamping adjustment knob 64 which, in the illustrated embodiment, is manually turned clockwise to clamp or lock the nosepiece movable portion 54 in a desired position with reference to the nosepiece base portion 52, and turned counterclockwise to release clamping pressure for reciprocation direction adjustment purposes.

Figure 6:
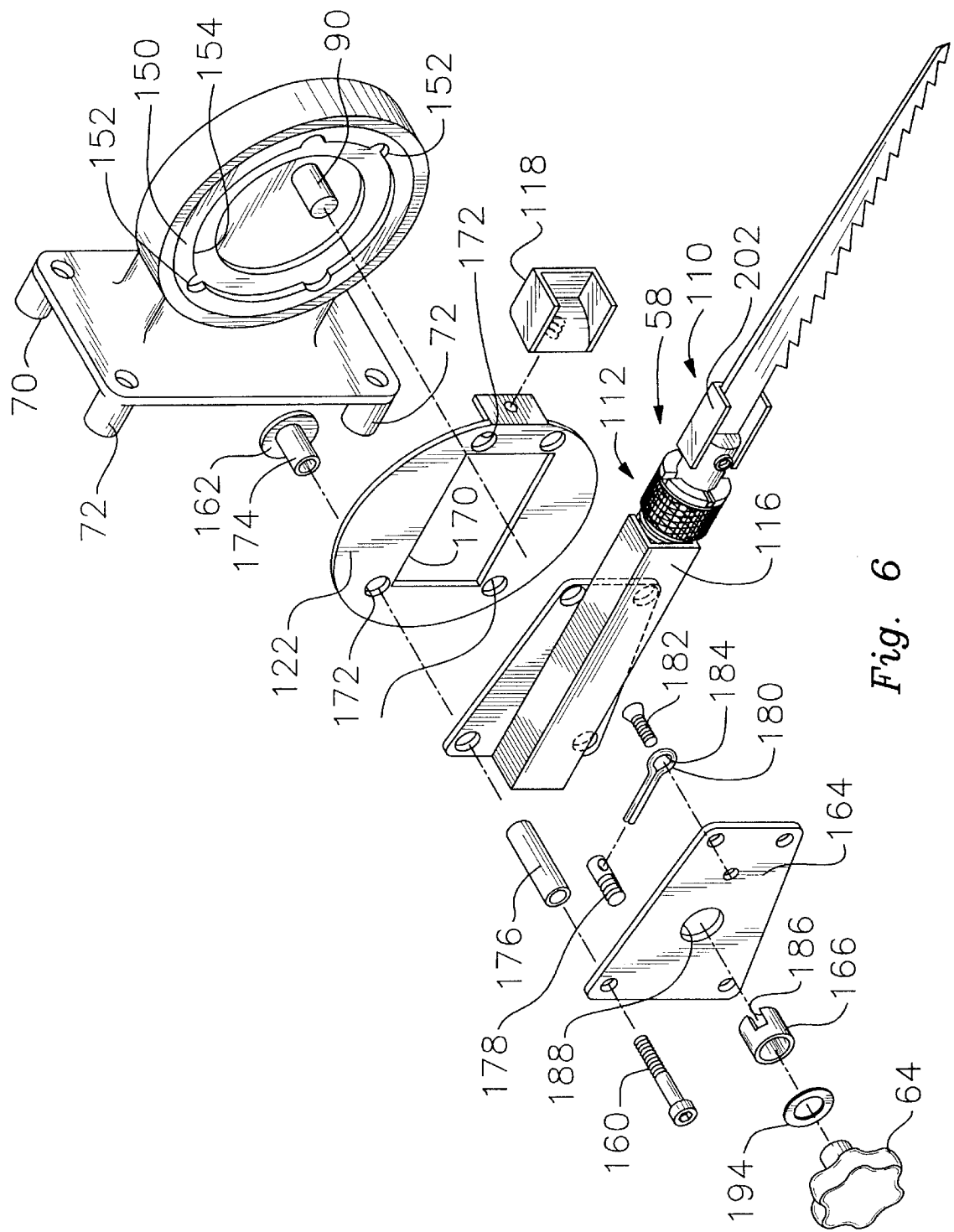
FIG. 6 is an exploded view of a portion of the assembly of FIG. 5.

With reference to FIGS. 5 and 6 for a more detailed view, the nosepiece base portion 52 includes mounts 70 and 72 which are secured to the motor housing 32 by means of screws 74. The motor shaft 34 terminates in a pinion gear 76, and is supported by a roller bearing assembly 78 within the nosepiece base portion 52. A driven gear 80 in the form of a bevel gear 80 is mounted on a crank shaft 82, supported by a pair of ball bearing assemblies 84 and 86, mounted within the nosepiece base portion 52, and has teeth engaging the pinion gear 76. The driven bevel gear 80 and crank shaft 82 rotate on the nosepiece axis, the same axis on which the nosepiece moveable portion 54 can be rotated for adjustment purposes, and which is at right angles to the axis of the motor shaft 34.

A crank pin 90 is connected to the driven bevel gear 80 radially offset from the crank shaft 82, and thus from the nosepiece axis. The crank pin 90 accordingly moves in a circle as the driven bevel gear 80 rotates. The crank pin 90 more particularly includes a fixed pin 92 secured to the driven bevel gear 80, and a freely rotating crank pin cap 94 mounted to the fixed pin 92 on roller bearings 96 in order to reduce frictional wear during operation.

Although the crank pin 90 is illustrated as directly connected to the driven bevel gear 80, it will be appreciated that various other mechanically-equivalent arrangements may be employed, such as providing a separate crank arm (not shown) driven by the crank shaft. Such an embodiment is described hereinbelow with reference to FIGS. 14–17.

To convert rotational motion of the driven bevel gear 80 to reciprocating motion of the reciprocating bar 56, a Scotch yoke mechanism is provided. Thus, with particular reference to FIGS. 5 and 9, channel-like yoke 100 U-shaped in cross-section is attached to the reciprocating bar 56 by means of a screw 102, with the channel of the yoke 100 at right angles to the reciprocating bar 56 and in engagement with the crank pin 90 (FIGS. 5 and 6). During operation, as the driven bevel gear 80 rotates, the reciprocating bar 56 is driven to reciprocate along the reciprocation motion axis, while at the same time crank pin 90 moves back and forth within the U-shaped channel of the yoke 100, the freely rotating crank pin cap and roller bearings 96 serving to minimize friction. The reciprocating bar 56 is supported by a pair of bearing blocks 104 and 106 within the nosepiece moveable portion 54. To accommodate the full range of reciprocating movement of the reciprocating bar 56, a clearance aperture 108 is provided.

Figure 9:
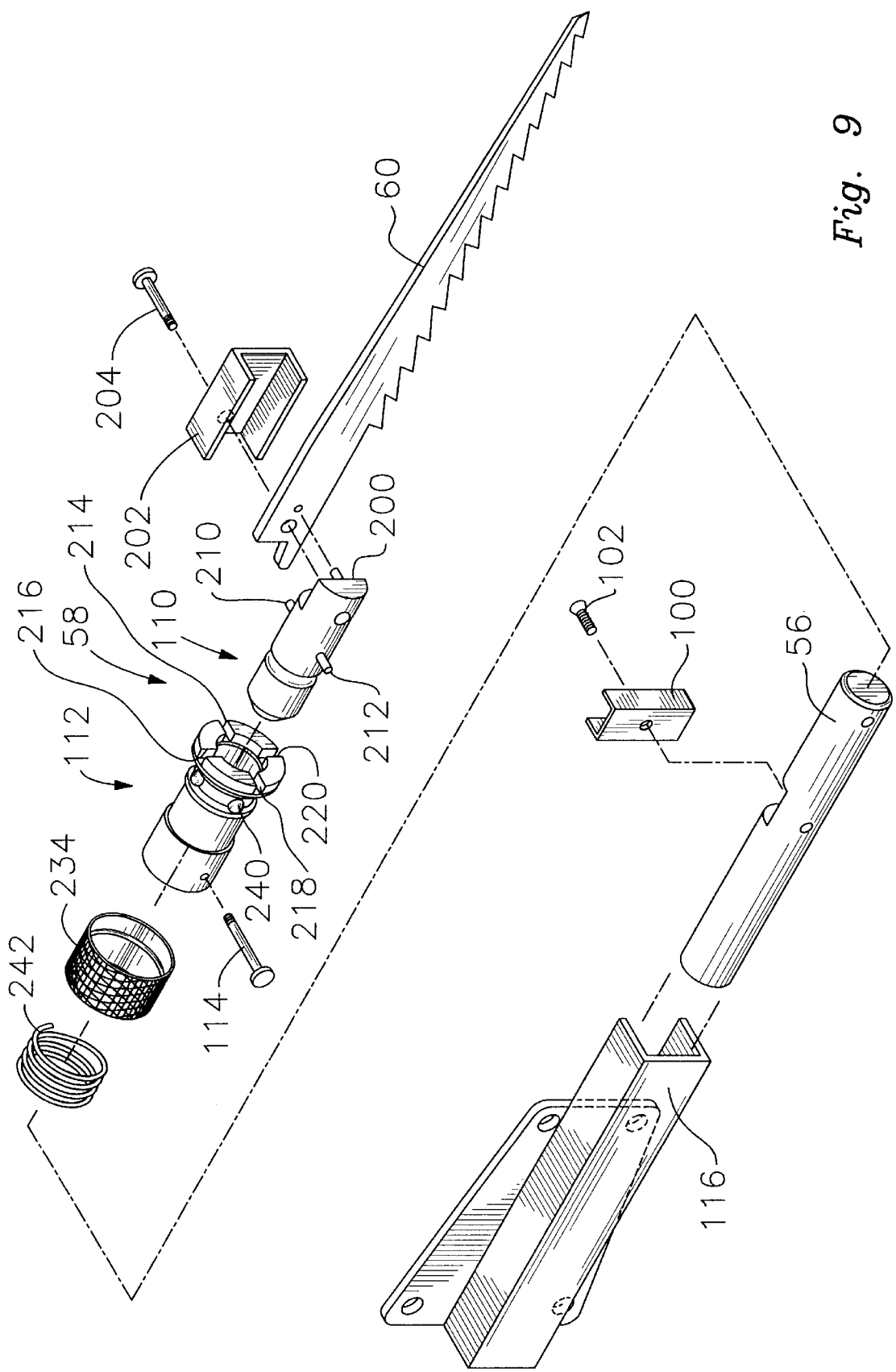
FIG. 9 is an exploded view of a portion of assembly FIG. 6, and showing yoke and saw blade attachment details.

With particular reference to FIG. 6 and the exploded view of FIG. 9, the toolholder 58 is fixed to the reciprocating bar 56. More particularly, the toolholder 58 has a removable pin portion 110 to which a tool (e.g. saw blade 60) is attached, and a receiver portion 112 attached to the reciprocating bar 56. In FIG. 5, only the receiver portion 112 is shown, attached to the reciprocating bar 56 by means of a representative threaded pin 114. The toolholder receiver portion 112 reciprocates within a nosepiece extension having an upper half 116 which is a part of the nosepiece moveable portion 54, and a lower half 118, secured by means of a screw 120 to a guard plate 122.

The rotatable mounting of the nosepiece moveable portion 54 to the nosepiece base portion 52 is shown in FIGS. 5 and 6. A channel element 130 of ring configuration having a relatively narrower upper flange 132 and a relatively wider lower flange 134 is secured to the nosepiece 50 base portion 52 by a number of screws, such as representative assembly screw 136. The relatively wider lower flange 134 extends radially inwardly over an annular notch 138 at the upper edge of the driven bevel gear 80.

Captured within the upper and lower flanges 132 and 134 of the ring element 130 is a clamp ring 150, having a series of semicircular clearance notches 152 formed in its radially inwardly-facing edge 154. The clamp ring 150 and the channel element 130 cooperate to define a bearing for adjustment rotation of the nosepiece 50 moveable portion 54 on the nosepiece 50 base portion 52 upon the nosepiece axis, the nosepiece axis being coincident with the axis of the crank shaft 82.

The nosepiece moveable portion 54 is attached to the clamp ring 150 by means of a set of clamp screws 160 which pass through the assembly, and engage a set of T-nuts 162 located within the semicircular notches 152, and generally under the clamping ring 150. The clamping screws 160 engage a top plate 164 associated with the clamping knob 64. When it is desired to clamp the nosepiece moveable portion 54 in position, the knob 64 is rotated, which pushes a slotted collar 166 against the top of the nosepiece moveable portion 54, producing upward force on the top plate 164. This upward force is transmitted through the clamp screws 160 to the T-nuts 162, pulling the clamping ring 150 upwardly into tight engagement with the upper flange 132 of the ring element 130, thereby securing the nosepiece moveable portion 54 and therefore reciprocation axis of the saw blade 60 in a particular orientation with reference to the nosepiece 50 base portion 52 and the motor housing 32.

With particular reference to FIG. 6, the guard plate 122 is sandwiched between the nosepiece 50 moveable portion 54 and the upper flange 132 of the ring element 130, providing support for the nosepiece extension lower half 118. A central rectangular opening 170 in the guard plate 122 provides sufficient clearance for circular motion of the crank pin 90 and for reciprocating motion of U-shaped yoke 100. Circular apertures 172 in the guard plate 122 are provided through which the cylindrical portions 174 of the T-nuts 162 pass. To minimize wobbling of the top plate 164 when the clamp knob 64 is loosened for position adjustment, spacers 176 are provided around the clamp screws 160. The spacers 176 do not serve as load-bearing members during operation, as longitudinal clearance is provided.

Figure 7:
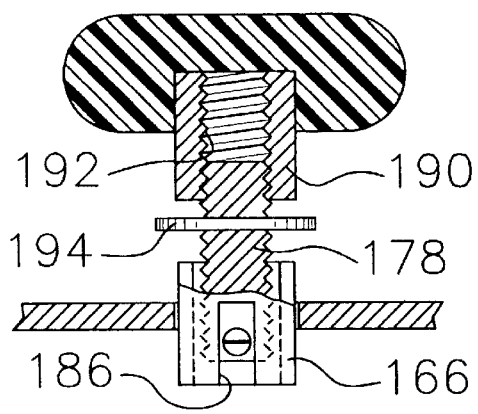
FIG. 7 is a cross-sectional view of the clamp adjustment handle.
Figure 8:
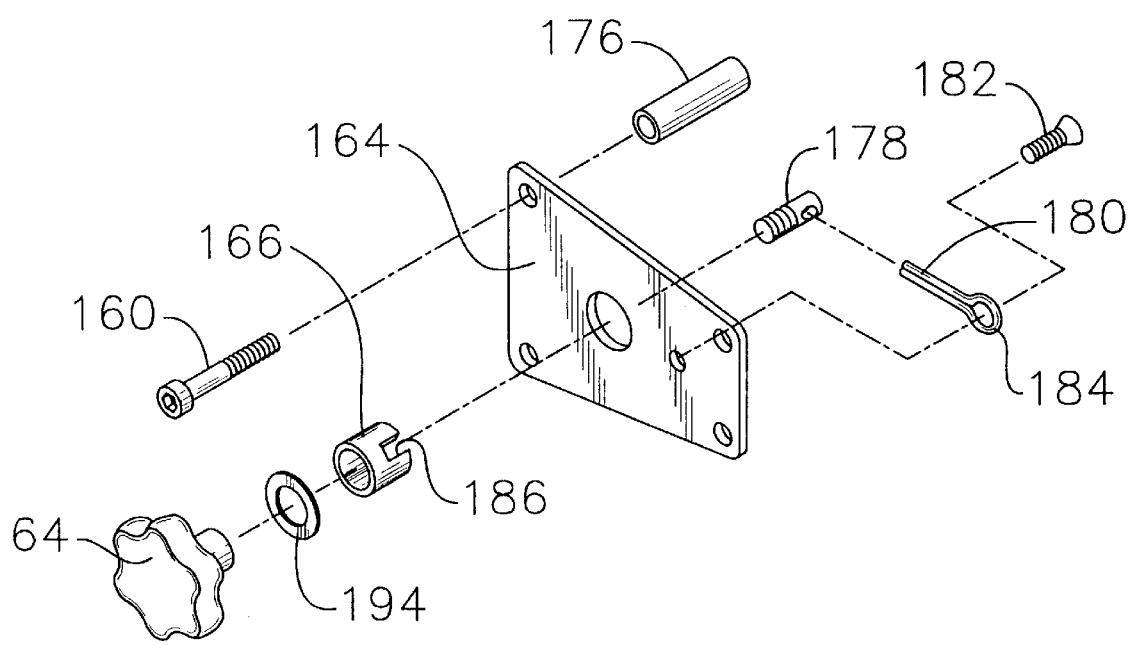
FIG. 8 is an exploded view of the portion of the clamp adjustment mechanism.

With particular reference to FIGS. 5, 7 and 8, the clamping mechanism 62 serves to urge the slotted collar 166 downwardly against the top of the nosepiece 50 moveable portion 54, while at the same time pulling up on the top plate 164, thus transmitting upward clamping force to the clamp ring 150. A threaded stud 178 has a diametrical aperture through which a cotter pin 180 passes, and a screw 182 fastens the eye 184 of the cotter pin 180 to the underside of the top plate 164. The slotted collar 166 fits around the threaded stud 178, which also has a pair of diametrically opposed slots 186 to provide clearance for the cotter pin 180 as the slotted collar 166 is pushed by the knob 64 along the threaded stud 178 downwardly against the nosepiece 50 moveable portion 54. The slotted collar 166 passes loosely through an aperture 188 in the top plate 164.

Fixed to the knob 64 is an insert 190 having internal threads 192 which engage threads on the threaded stud 178. A washer 194 is interposed between the internally threaded insert 190 and the slotted collar 166, transmitting force to the slotted collar 166. Thus, as the knob 64 is turned clockwise, upward force is exerted on the top plate 164 through the cotter pin 180, and threaded stud 178, while downward force is applied to the slotted collar 166, which transmits this force to the nosepiece 50 moveable portion 54.

With reference to FIGS. 9, 10, 11, 12 and 13, one form of an adjustable toolholder 58 will now be described. Depending upon the particular work being performed with the reciprocating saw 30 and the particular orientation selected as shown in FIGS. 1–4, it is advantageous to be able to change the angular orientation of the saw blade 60 on the reciprocation motion axis. It is not unusual for reciprocating saws to provide a blade holder whereby the orientation of the blade can be changed by 180° by unclamping the blade 60, and turning it over, and replacing it in the toolholder. The arrangement of FIGS. 9–13 allows four different angular orientations of the blade 60, at 90° intervals on the reciprocation motion axis. It will be appreciated that a greater number of different angular positions can be provided, such as eight different orientations at 45° intervals.

In the particular toolholder 58 illustrated, the removable pin portion 110 has a flat 200 against which the saw blade 60 is retained by a clamp element 202 secured by a clamp screw 204. The receiver portion 112 of the toolholder 58 is secured to the reciprocating bar 56 by means of the threaded pin 114.

To define the exemplary four different orientations at 90° intervals, there are a pair of locating pins 210 and 212 on the pin portion 110, which selectively engage a set of four slots 214, 216, 218 and 220 in the receiver portion 112.

Figure 12:
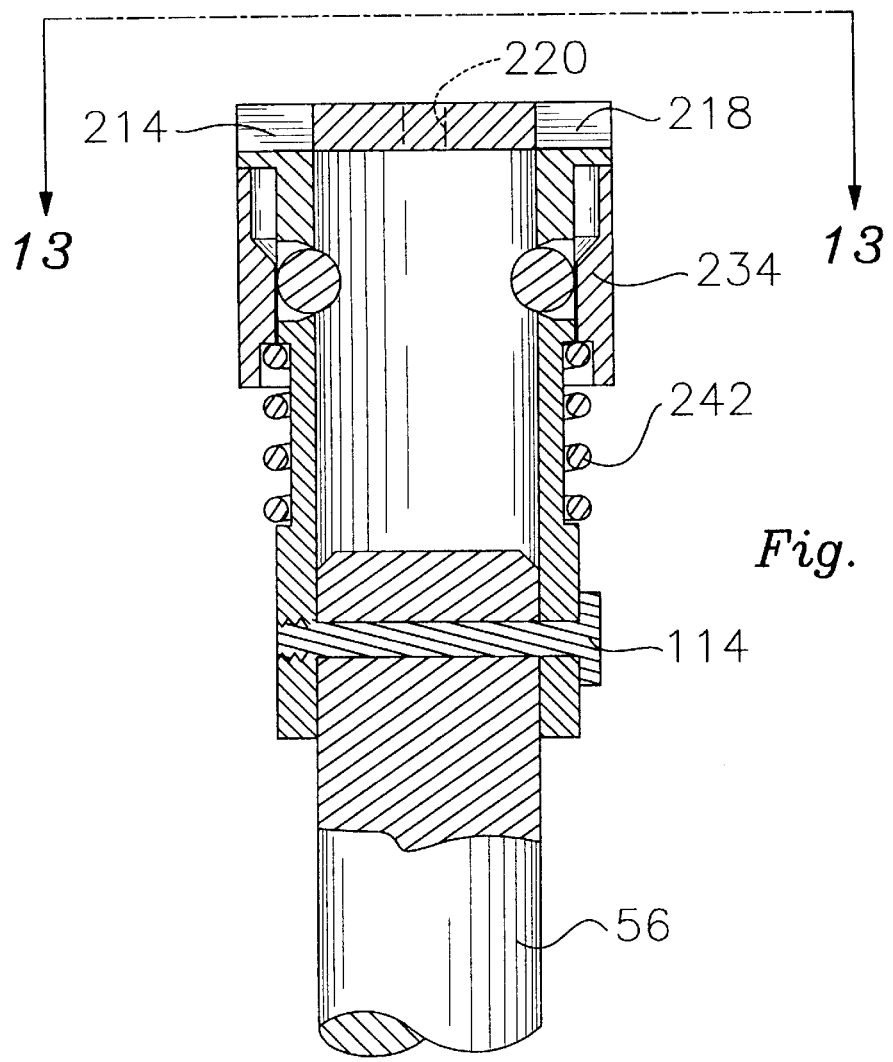
FIG. 12 is a similar cross-sectional view of the receiver portion of the toolholder in a locking configuration.
Figure 13:
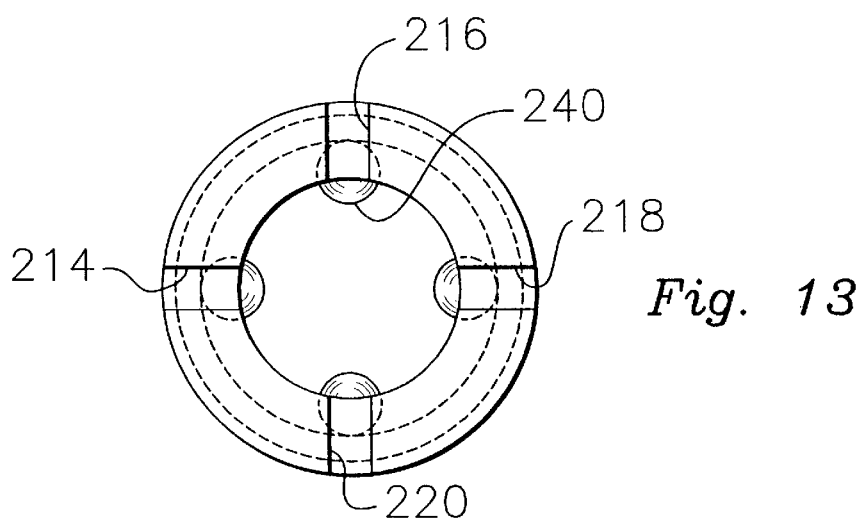
FIG. 13 is a view taken on line 13—13 of FIG. 12.

With particular reference to FIGS. 11 and 12, the receiver portion 112 has a main body 230 terminating in a flange 232 in which the slots 214, 216, 218 and 220 are formed, as well as a sliding collar 234 having a lip 236 and a bearing surface 238 which control the position of a set of retaining balls 240.

A spring 242 urges the collar 234 upwardly towards the position illustrated in FIG. 12. When assembled, the retaining balls 240 engage an annular groove 244 semicircular in cross-section formed in the removable pin element 110, while the pins 210 and 212 engage selected opposite ones of the slots 214, 216, 218 and 220.

In the configuration of FIG. 11, the collar 234 has been moved by finger pressure towards the body of the tool 30 against the force of spring 242, releasing the balls 240 such that the balls 240 are free to be sufficiently withdrawn from the annular groove 244 and from their apertures so as to permit insertion and removal of the pin element 110, and attached saw blade 60.

In the relaxed position of FIG. 12, which also corresponds to the position of the receiver element 112 when the pin element 110 has been inserted and is retained, the balls 240 are securely held partially within the bore, in locking engagement with the annular groove 244, when the pin element 110 is inserted.

An advantage of this particular toolholder, in addition to allowing positional adjustment to various angular rotations on the reciprocation motion axis, is essentially instant changing of saw blades. Thus, a set of different saw blades 60 may be carried, such as for cutting wood, cutting metal and cutting plaster, secured to individual pin elements 110. At any time the desired saw blade and its attached pin element 110 can quickly be inserted into the receiver element 112, after removing the previously-used saw blade and its associated pin element 110.

With reference to FIGS. 14–17, shown in somewhat diagrammatic form is an alternative construction with a different clamping mechanism.

Figure 14:
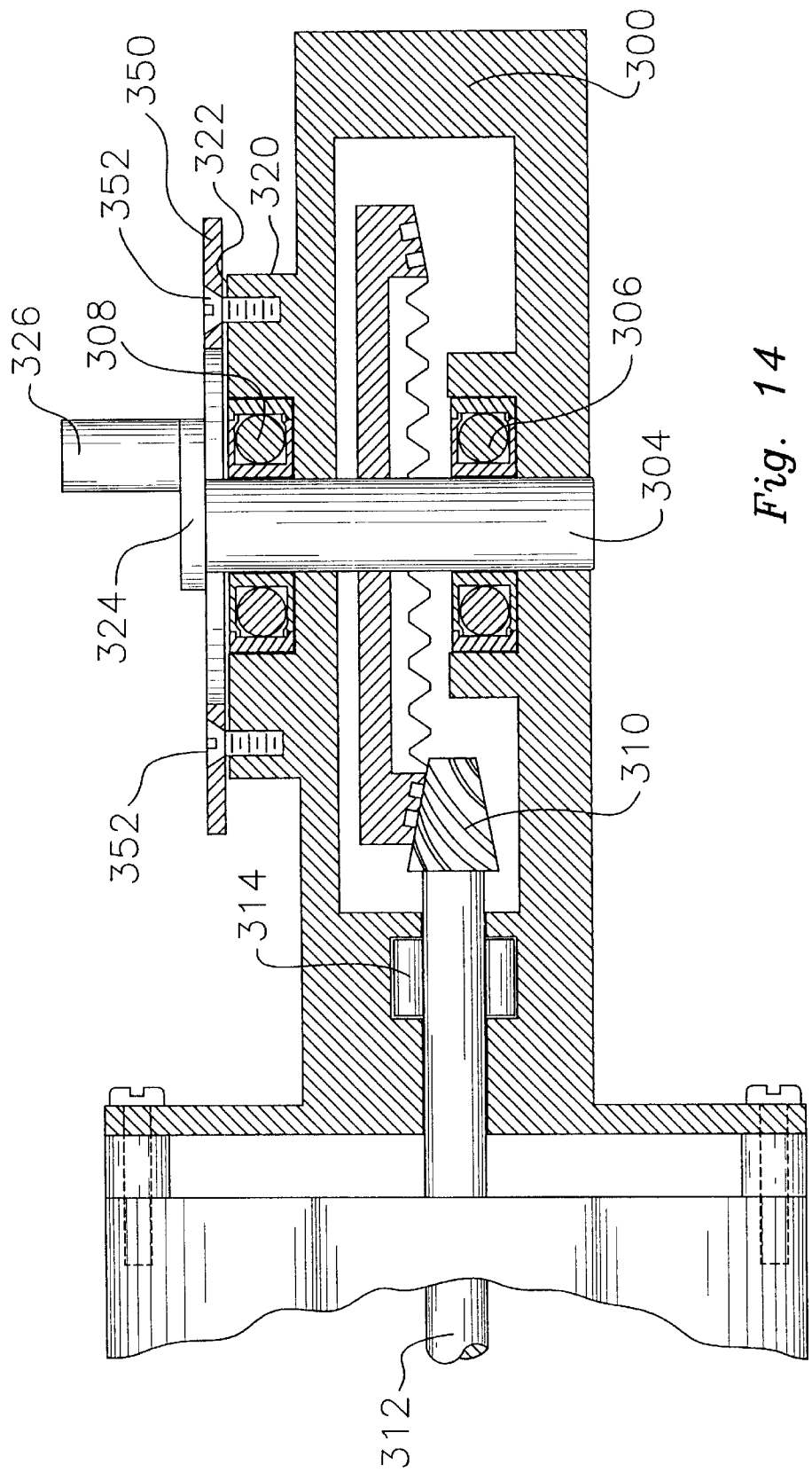
FIG. 14 is a cross-sectional view of the nosepiece base portion of a second embodiment of the invention.

In FIG. 14, a nosepiece base portion 300 includes a driven bevel gear 302 on a crank shaft 304 supported by bearing assemblies 306 and 308, driven by a pinion gear 310 connected to the end of a motor shaft 312 supported by a roller bearing assembly 314.

The nosepiece base portion 300 includes an upper cylindrical clamping surface 320 terminating in a top surface 322 past which a crank arm 324 and a crank pin 326 project.

Figure 15:
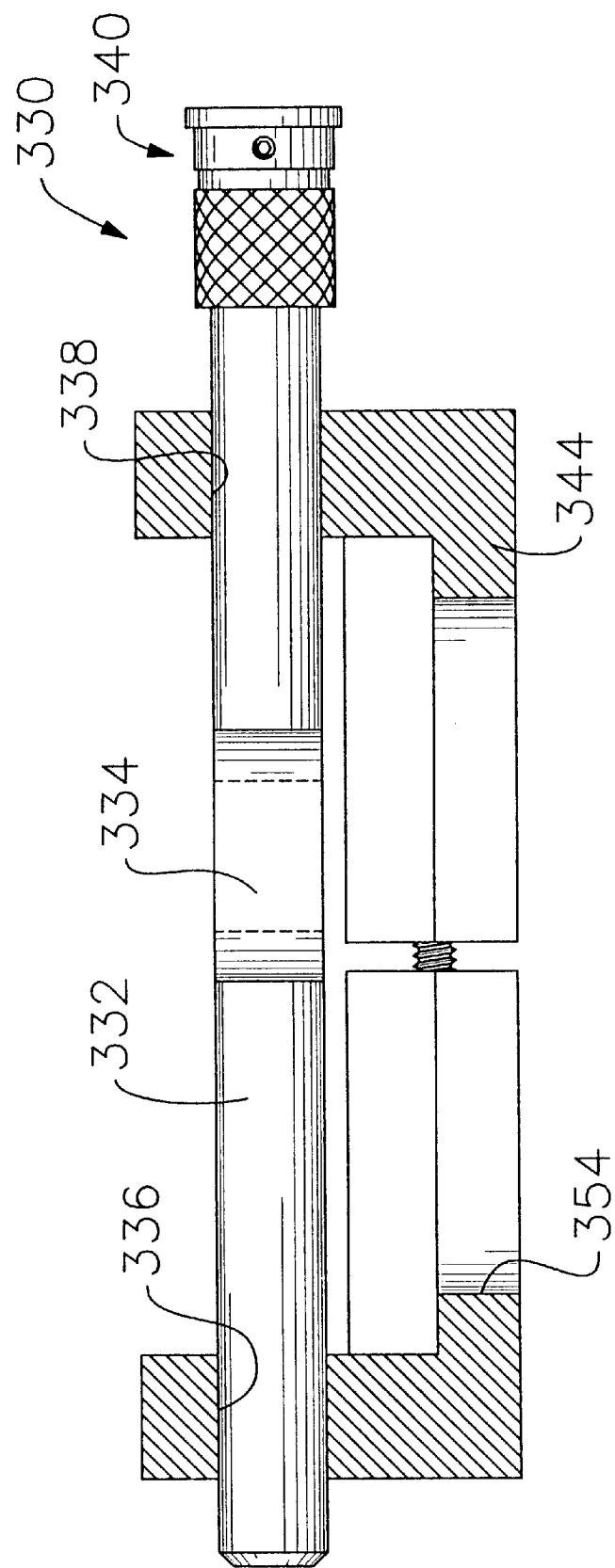
FIG. 15 is a cross-sectional view of the nosepiece movable portion of the second embodiment.

With particular reference to FIG. 15, a nosepiece moveable portion 330 supports a reciprocating bar 332 including a Scotch yoke 334, which reciprocates within bearing blocks 336 and 338. The receiver part 340 of a toolholder as described hereinabove is affixed to an end of the reciprocating bar 332.

The lower portion of FIG. 15 nosepiece moveable portion 330 takes the form of a clamping ring 344, circumferentially split at 346 (FIG. 17) with a clamping screw 348 in the form of a wing nut 348.

Figure 16:
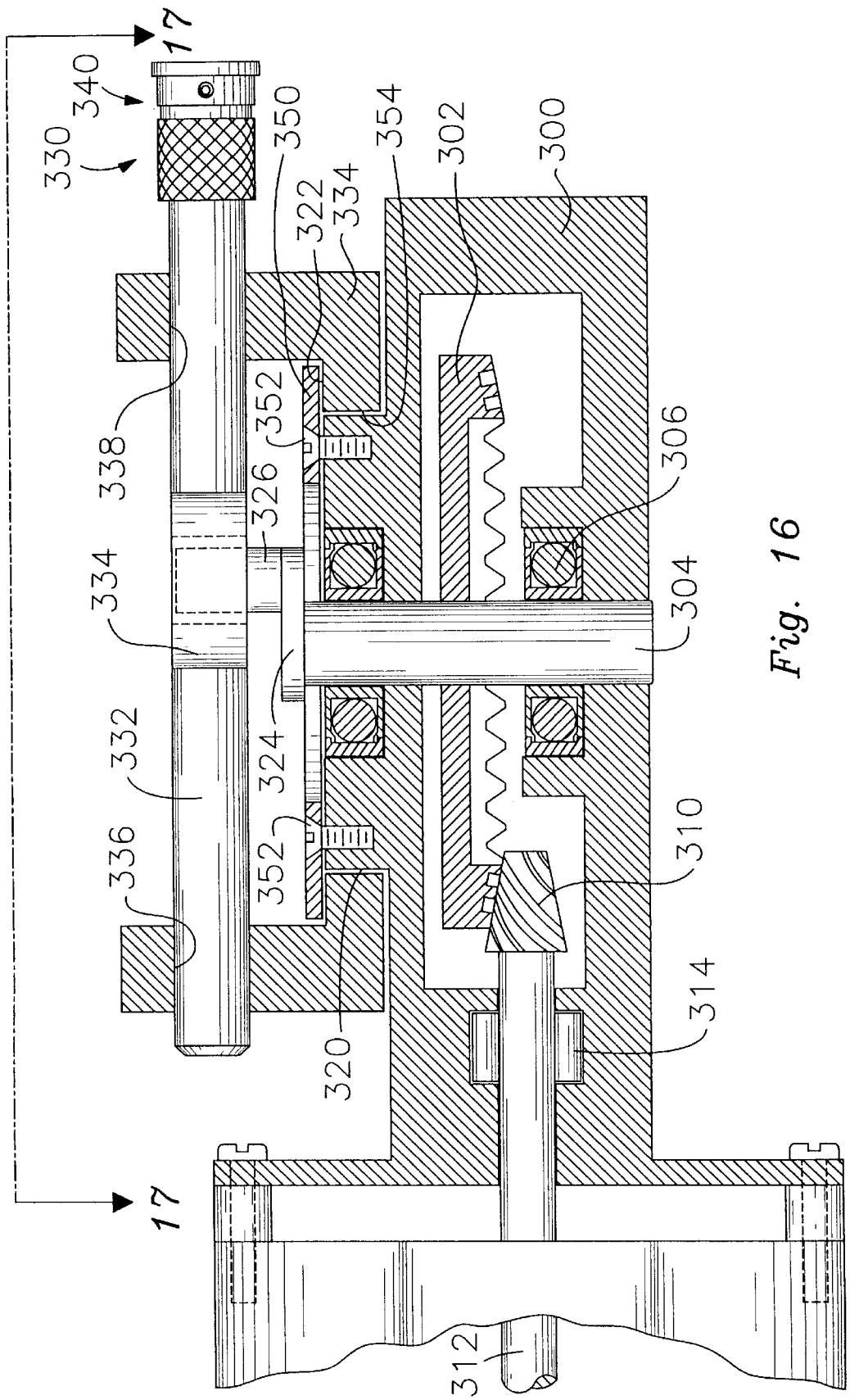
FIG. 16 is an assembled view of the nosepiece base portion of FIG. 14 and the nosepiece movable portion of FIG. 15.
Figure 17:
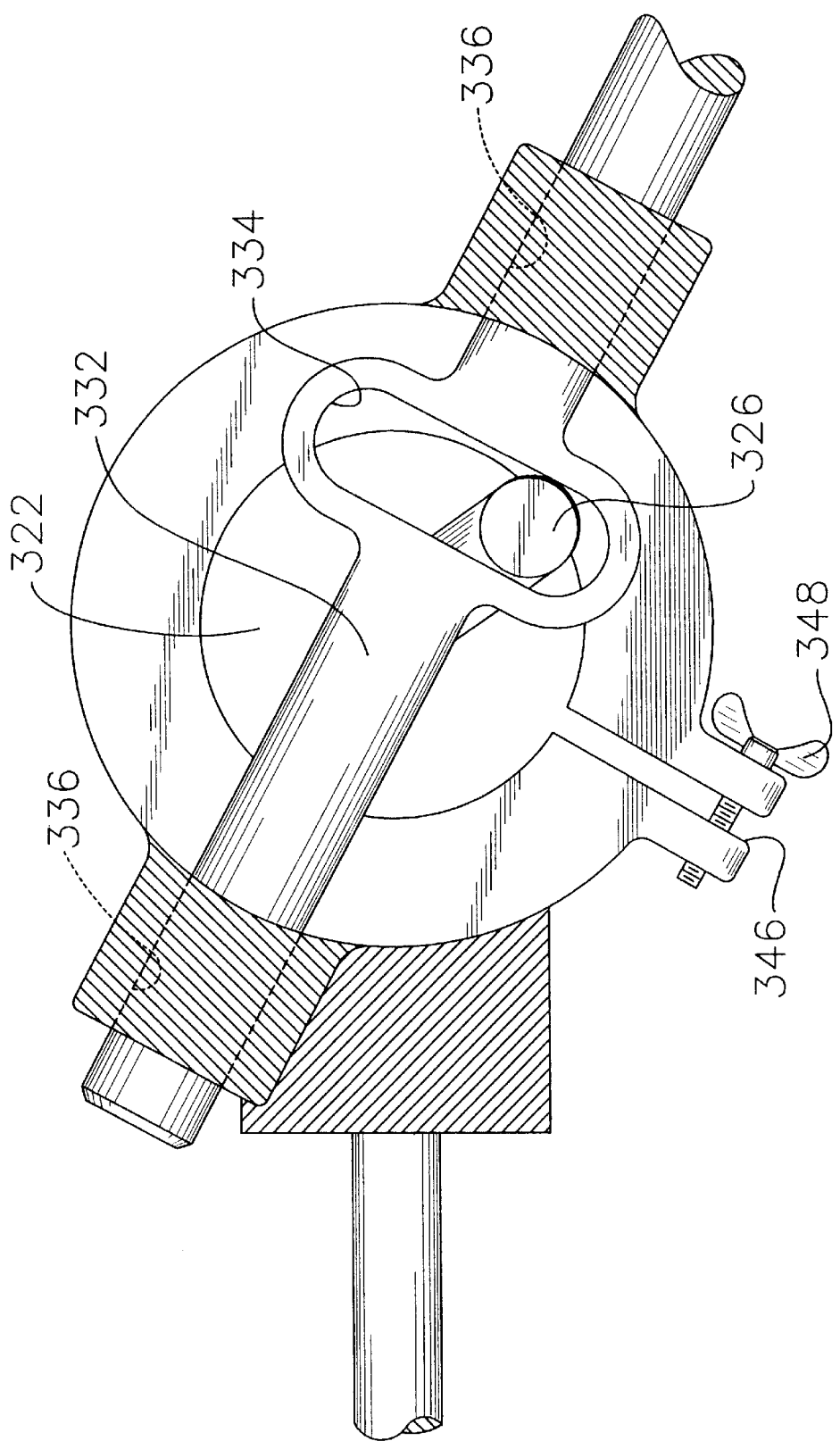
FIG. 17 is a view taken generally along line 17—17 of FIG. 16.

In the assembled position of FIG. 16, the nosepiece moveable portion 330 is retained over the cylindrical bearing surface 320 of the nosepiece base portion 300 by means of a retaining ring 350 secured by screws 352, while the nosepiece moveable portion 330 is free for rotational adjustment. When clamp screw 348 is tightened, inner surface 354 of the clamping ring 344 tightens against the cylindrical clamping surface 320 of the nosepiece base portion 300.

Figure 18:
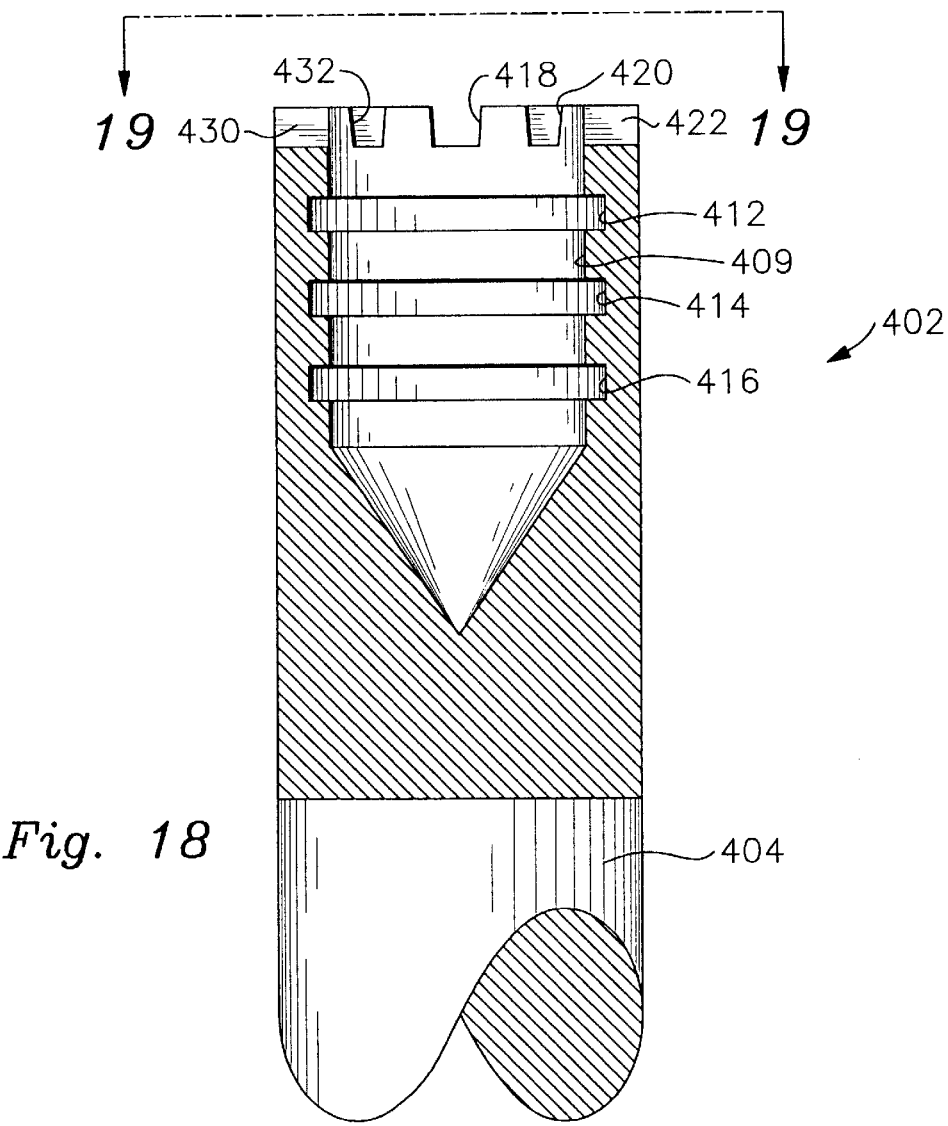
FIG. 18 is a cross-sectional view of the receiver portion of an alternative toolholder.
Figure 19:
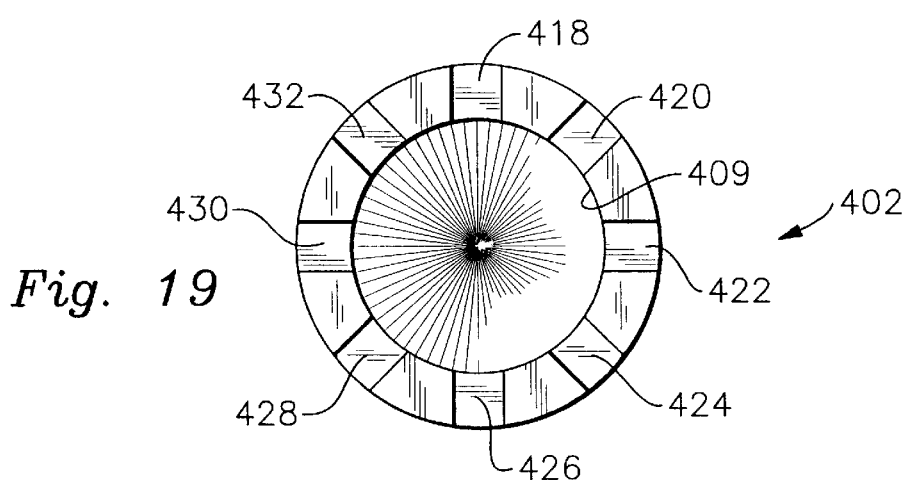
FIG. 19 is a top view taken on line 19—19 of FIG. 18.
Figure 24:
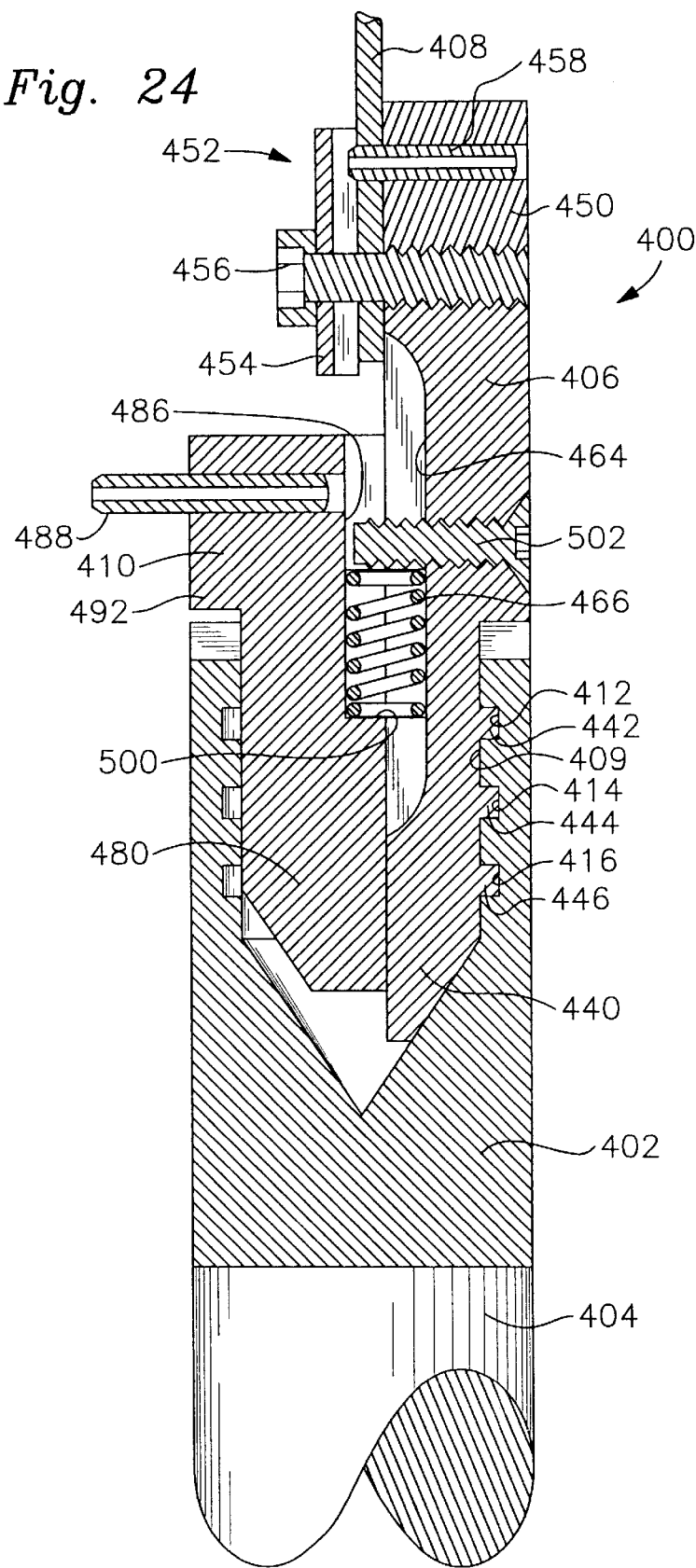
FIG. 24 is a cross-sectional view of the alterative toolholder fully assembled and in its release configuration.
Figure 25:
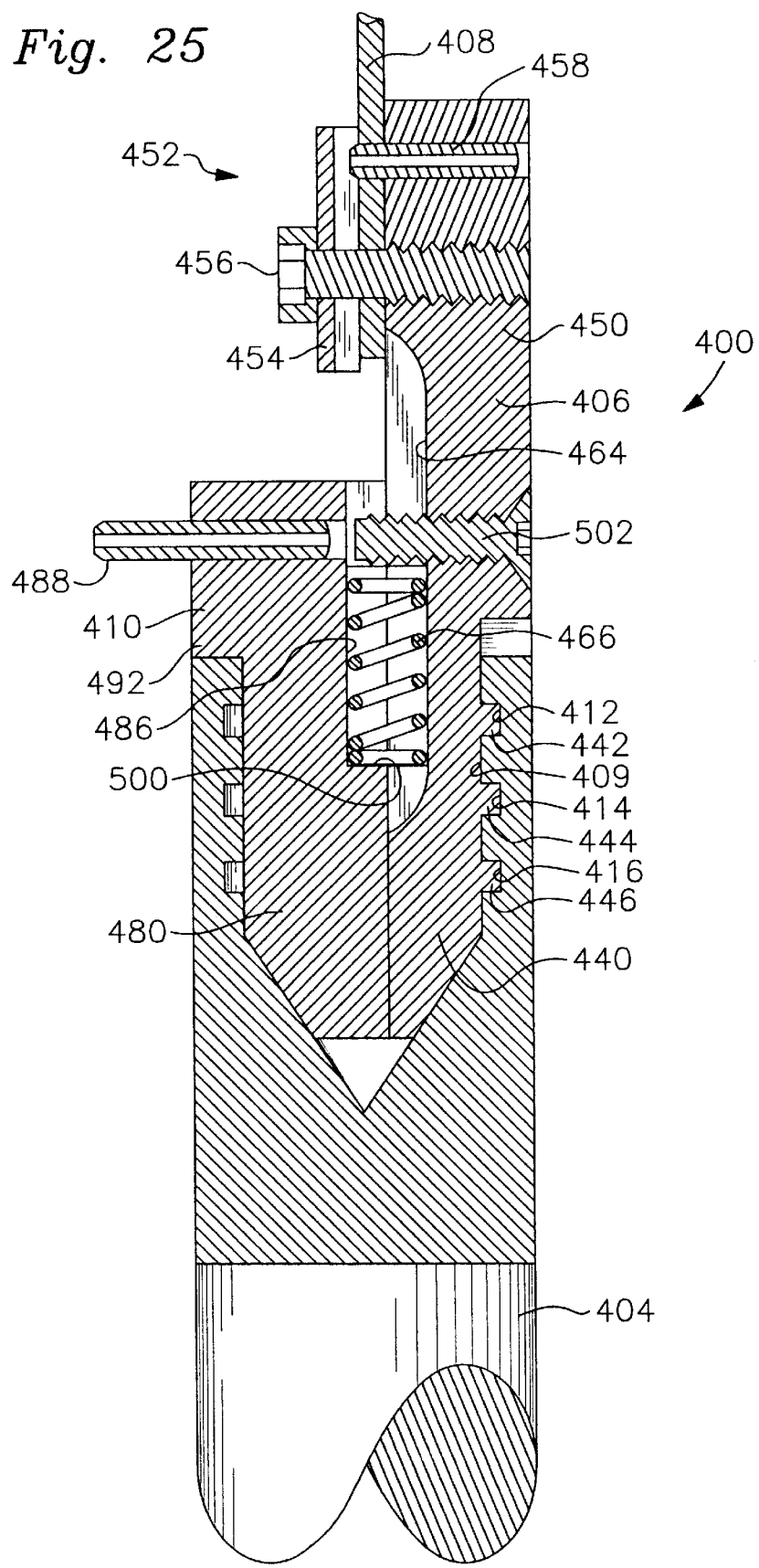
FIG. 25 is a cross-sectional view of the alternative toolholder fully assembled and in its locking configuration.

Finally, FIGS. 18–25 disclose an alternative toolholder 400. The alternative toolholder 400 differs from the toolholder 58 in that radially-extending lands and corresponding channels transmit the reciprocation motion rather than balls and an annular groove, and the part which holds the blade remains attached to the rest of the tool unless deliberately disassembled. FIGS. 18 and 19 show a receiver portion 402 of the alternative toolholder 400 in isolation, the receiver 402 being formed as an extension of a reciprocating bar 404, corresponding to the reciprocating bar 56 described hereinabove. FIGS. 20 and 21 show a tool or blade shuttle 406 with an attached tool such as a representative saw blade 408, and FIGS. 22 and 23 show a locking shuttle 410 which cooperates with the blade shuttle 406 to define a shuttle assembly. FIGS. 24 and 25 show the toolholder 400 fully assembled, FIG. 24 showing the toolholder 400 in its release configuration for adjustment, and FIG. 25 showing the toolholder 400 in its locking configuration for use.

Referring to FIGS. 18 and 19, the receiver portion 402 includes a bore 409 with a series of annular channels or grooves 412, 414 and 416 for transmitting reciprocating motion. Around the open end of the bore 409 is a first rotational locking device in the form of a series of slots or indentations 418, 420, 422, 424, 426, 428, 430 and 432 for retaining the shuttle portions 406 and 410 at a particular angular orientation on the reciprocation motion axis with reference to the receiver 402 and the reciprocating bar 404. In the illustrated embodiment, the slots or indentations are at 45° intervals.

Referring to FIGS. 20 and 21, the blade shuttle 406 includes a pin portion 440 which occupies less than half of a cylinder thus extending over less than 180°. The pin portion 440 supports a set of three radially-extending lands 442, 444, and 446 which engage respective channels 412, 414, 416 of the receiver portion 402. Integral with the pin portion 440 is a wider attachment portion 450, which includes a tool clamp, generally designated 452, for retaining the exemplary saw blade 408 or other tool. The tool clamp 452 includes a clamp element 454, a clamp screw 456, and a locating pin 458.

The pin portion 440 at its lower end has a flat tip 460 which is less than a half-circle as is best seen in FIG. 21, and a surface 462 which is part of a cone. The blade shuttle 406 has a central longitudinal recess 464 for receiving a spring 466 (FIGS. 24 and 25).

As noted above, the pin portion 440 of the blade shuttle 406 occupies less than half of a cylinder. As shown in FIG. 21, there are two imaginary center points 470 and 472. Thus, point 470 may be viewed as the true center, around which the flat tip 460, the surface 462 and the outer periphery of the attachment portion 450 are defined. The radially-extending lands 442, 444 and 446 however are defined around offset center 472, thus permitting assembly of the toolholder 400.

The locking shuttle 410 shown in isolation in FIGS. 22 and 23 includes a lower pin portion 480 generally comprising a semi-cylinder extending over more than 180°. The pin portion 440 of the blade shuttle 406 and the pin portion 480 of the locking shuttle 410 together define a complete cylinder. The pin portion 480 has a flat tip 482 which is more than half of a circle, corresponding to the flat tip 460 of the blade shuttle 406, as well as a surface 484, which is part of a cone, and likewise corresponds the portion 462 of the blade shuttle 406. The pin portion 480, the flat tip 482 and the surface 484 are defined around the true center 470 (FIG. 23).

The locking shuttle 410 includes a central longitudinal recess 486 which cooperates with the recess 464 to receive the spring 466, and has a finger grip element 488 for moving the locking shuttle 410 against spring pressure, as is illustrated in FIG. 24. Finally, the locking shuttle 410 includes a second rotational locking device in the form of three downwardly-projecting locking tabs 490, 492 and 494, spaced at 45° intervals, and cooperating with the locking slots 418, 420, 422, 424, 426, 428, 430 and 432 of the receiver portion 402. It will be appreciated that the rotational locking configuration can be reversed, i.e. tabs on the receiver portion 402 and slots on the locking shuttle 410.

From the fully-assembled views of FIGS. 24 and 25, it can be seen that the lower end of the spring 466 pushes against a ledge 500 within the recess 486 of the locking shuttle 410, while the upper end of the spring 466 pushes against a spring retainer in the form of a screw 502 received within the tool attachment portion 450 of the blade shuttle 406. Spring force accordingly holds the locking tabs 490, 492 and 494 within selected ones of the locking slots 418, 420, 422, 424, 426, 428, 430 and 432.

For assembly of the toolholder 400, the blade shuttle 406 (with the tool clamp 452 and the spring retainer 502 entirely removed) is inserted into the bore 409 of the receiver 402. Insertion is possible since the pin portion 440 extends over less than 180° and the center point 472 (FIG. 21) of the radially-extending lands 442, 444 and 446 is offset from the true center line represented by point 470. During assembly, the blade shuttle 406 is moved into the position with the radially-extending lands 442, 444 and 446 engaging the respective channels 412, 414 and 416. Then, the locking shuttle 410 is inserted followed by the spring 466 and the spring retainer 502. Finally, the tool clamp 452 is installed.

In the in-use locking configuration of FIG. 25, the lands 442, 444 and 446 in cooperation with the channels 412, 414 and 416 transmit reciprocating force, while the locking tabs 490, 492 and 494 in cooperation with selected ones of the locking slots 418, 420, 422, 424, 426, 428, 430 and 432 restrain the blade shuttle 406 from rotation relative to the receiver element 460 on the reciprocation motion axis. To achieve different angular orientations on the reciprocation motion axis, the finger grip 488 is employed as is illustrated in FIG. 24 to lift the locking shuttle 410 and its locking tabs 428, 430 and 432 against pressure of the spring 466, allowing the blade shuttle 406 and the locking shuttle 410 to rotate together within the bore 409, while still restrained against axial movement by the flange lands 442, 444, and 446 cooperating with the channels 412, 414, and 416.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A reciprocating power tool comprising:

a motor housing having including a motor driving a motor shaft which rotates on a motor shaft axis;

a nosepiece including a nosepiece base portion fixed to said motor housing, and a nosepiece movable portion mounted to said nosepiece base portion and capable of being positionally adjusted relative to said nosepiece base portion by rotation on a nosepiece axis perpendicular to the motor shaft axis;

a driven gear within said nosepiece driven by a opinion gear connected to said motor shaft and rotating on a driven gear axis at least generally aligned with the nosepiece axis, said driven gear having a driven gear shaft supported by a bearing within said nosepiece base portion and not supported by said nosepiece moveable portion;

a crank pin connected to said driven gear radially offset from the nosepiece axis for circular motion as said driven gear rotates;

a reciprocating element supported by a pair of reciprocation bearings on said nosepiece movable portion and including a yoke element located intermediate said reciprocation bearings and engaging said crank pin such that said reciprocating element is driven to reciprocate along a reciprocation motion axis as said driven gear rotates, regardless of the rotational position of said nosepiece movable portion with reference to said nosepiece base portion; and a toolholder fixed to said reciprocating element for attachment of a tool.

2. The power tool of claim 1, wherein said toolholder is for attachment of a saw blade.

3. The power tool of claim 1, wherein said reciprocating element reciprocates within a reciprocating element plane perpendicular to the nosepiece axis.

4. The power tool of claim 1, wherein said nosepiece movable portion is capable of being positionally adjusted over a range of at least 180° by rotation on the nosepiece axis.

5. The power tool of claim 4, wherein at an intermediate position of said nosepiece movable portion said reciprocating elements reciprocate along a line parallel to the motor shaft axis.

6. The power tool of claim 5, further comprising a clamping mechanism which applies axial force with reference to said nosepiece axis for holding said nosepiece movable portion in a selected rotational position with reference to said nosepiece base portion and rigidly fixing said nosepiece moveable portion to said nosepiece base portion.

7. The power tool of claim 1, further comprising a clamping mechanism which applies axial force with reference to said nosepiece axis for holding said nosepiece movable portion in a selected rotational position with reference to said nosepiece base portion and rigidly fixing said nosepiece moveable portion to said nosepiece base portion.

8. The power tool of claim 1, wherein said toolholder is capable of being positionally adjusted to various angular orientations on the reciprocation motion axis.

9. The power tool of claim 8, wherein the angular orientations of said toolholder are at least at 90° intervals.

10. An angularly adjustable reciprocating power tool comprising:

a stationary housing and a movable housing;

a rotary power supply within said stationary housing, said rotary power supply having a power supply axis and providing torque to a pinion gear on an axis coincident with the power supply axis;

said pinion gear driving a bevel gear such that torque is transferred to a bevel gear axis and such that a rotational gear reduction is provided;

a crank pin connected to said bevel gear defining a bearing axis parallel to and radially offset from the bevel gear axis and generating a peripheral and circling motion on a crank pin orbit within a circular opening in said stationary housing which provides a bearing surface for angular adjustment of said moveable housing with reference to said stationary housing;

a reciprocating bar within said moveable housing, said reciprocating bar being greater in length than twice the diameter of the crank pin orbit, being supported upon a reciprocating axis by bearing surfaces, and including a yoke element intermediate said bearing surfaces such that said yoke element is free to reciprocate along but not rotate on the reciprocating axis;

said yoke element being positioned radially within a circular opening in said moveable housing such that, even when said circular opening in said moveable housing is loosely engaged with said circular opening in said stationary housing, said yoke element engages with said crank pin such that the crank pin orbit is closely perpendicular to said reciprocation axis and such that crank pin movement generates reciprocating movement in said yoke element;

a clamping mechanism for clamping said movable housing to said stationary housing without stress on any element selected from the group consisting of a power source, gearing, a motion conversion mechanism, a reciprocating mechanism, a power source mounting, a gearing mounting, a motion conversion mechanism mounting, a reciprocating mechanism mounting, a power source bearing surface, a gearing bearing surface, a motion conversion mechanism bearing surface, and a reciprocating mechanism bearing surface; and said clamping mechanism containing a device such that structural adhesion of said housings can be readily disengaged to allow for relative angular adjustment of said housings and then reapplied to prevent excessive drift of the bevel gear axis and the reciprocating axis as well as to prohibit angular movement of said moveable housing with respect to said stationary housing during powered usage.

* * * * *